May 21, 1929.  E. S. JOHNSON  1,714,027
ELECTRIC BREAD TOASTER
Filed Feb. 8, 1928   2 Sheets-Sheet 1
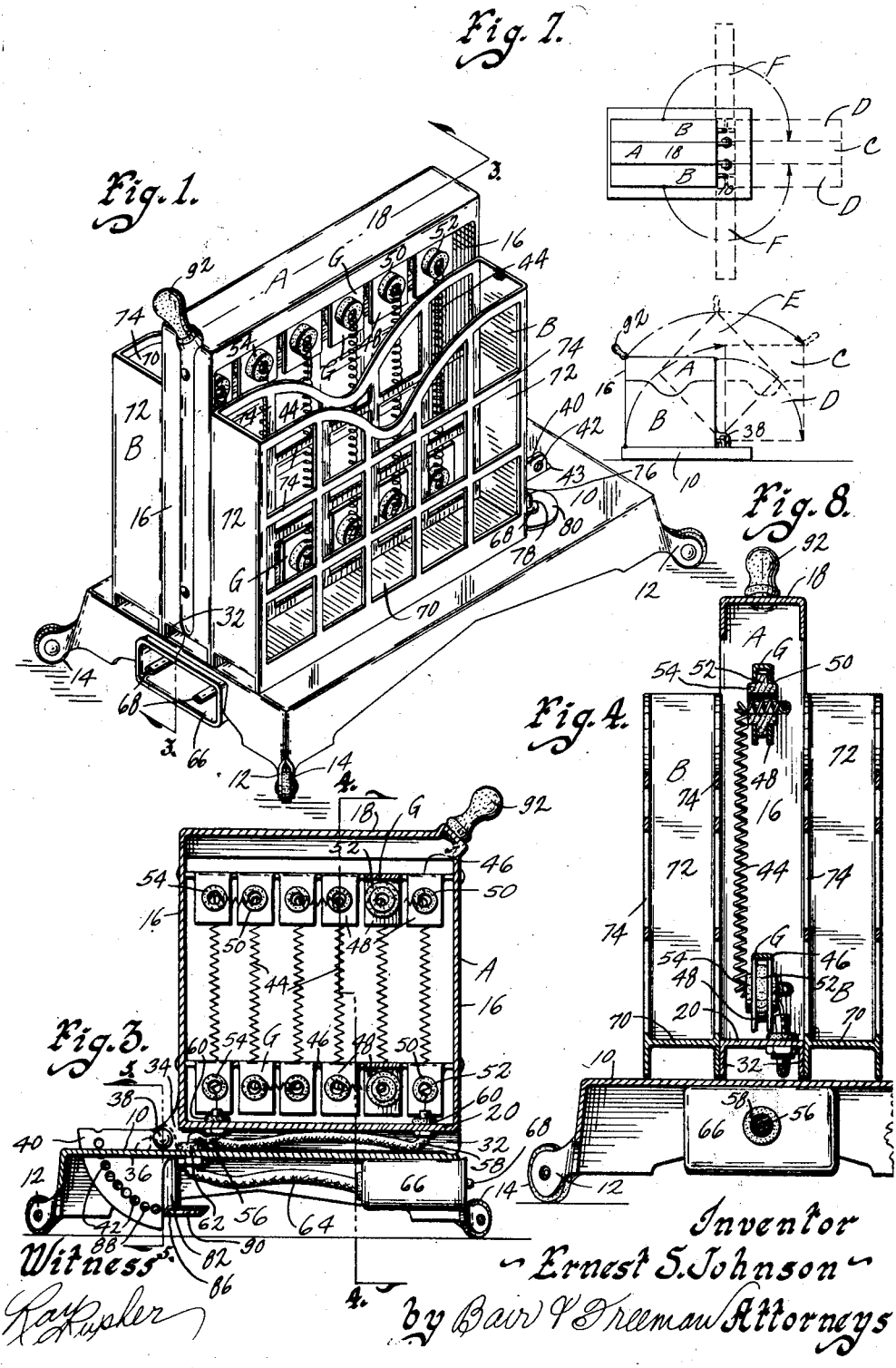
Inventor
Ernest S. Johnson
by Bair & Freeman Attorneys May 21, 1929.  E. S. JOHNSON  1,714,027
ELECTRIC BREAD TOASTER
Filed Feb. 8, 1928  2 Sheets-Sheet 2
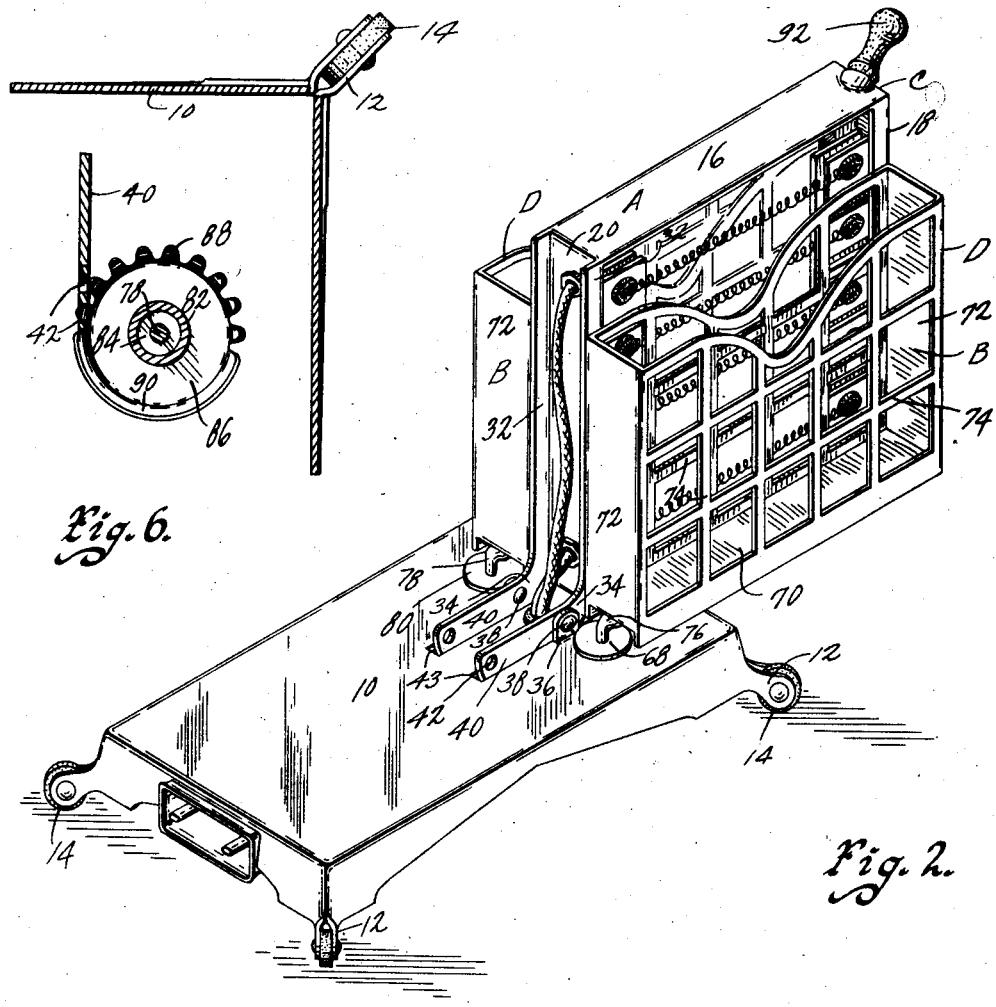
Fig. 6.
Fig. 2.
Fig. 5.
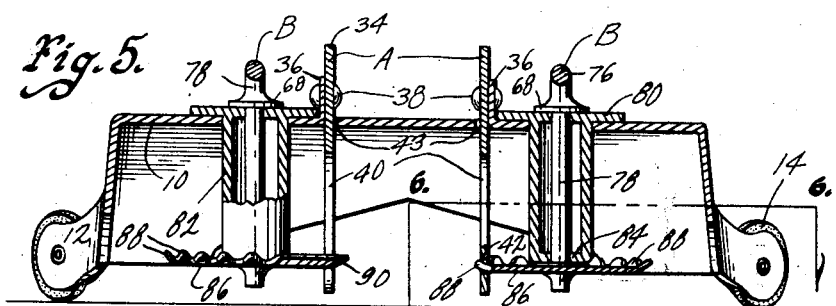
Witness
Ra Kusher
Inventor
Ernest S. Johnson
by Bair & Freeman Attorneys Patented May 21, 1929.

1,714,027

UNITED STATES PATENT OFFICE.

ERNEST S. JOHNSON, OF WEBSTER CITY, IOWA, ASSIGNOR TO KNAPP-MONARCH COMPANY, OF ST. LOUIS, MISSOURI, A CORPORATION OF MISSOURI.

ELECTRIC BREAD TOASTER.

Application filed February 8, 1928. Serial No. 252,744.

The object of my invention is to provide an electric bread toaster of simple, durable, and comparatively inexpensive construction.

A further object of my invention is to provide a toaster for bread in which the bread supporting members are mounted so that they can swing for the purpose of presenting first one side and then the other of the bread to the heat of the toaster element without the necessity of removing the bread from the bread supporting members, then reversing it and replacing it.

Still a further object is to mount the bread supporting members so that they will normally assume one position and when swung for reversing the bread they will assume another position. In connection with this construction it is also desirable to swing the toaster element so that it will act upon the reverse side of the bread when the bread supporting members are swung to the new position and I have provided for doing this by swinging the toaster element also.

Still a further object is to provide, in a toaster of this character, a base on which the bread supporting members are swingably mounted so that they can swing through half a revolution for reversing the bread relative to the toaster element and to so mount the toaster element that it can also swing to a new position for toasting the reverse side of the bread.

Still another object is to inter-connect the bread supporting members and the toaster element so that they will be swung simultaneously with one operation.

With these and other objects in view my invention consists in the construction, arrangement and combination of the various parts of my device, whereby the objects contemplated are attained, as hereinafter more fully set forth, pointed out in my claims and illustrated in the accompanying drawings. Although the invention is susceptible of a variety of embodiments, it is unnecessary to fully describe and illustrate more than one in order to give a full understanding of the invention both from its structural and functional standpoints. Accordingly, I have illustrated a preferred and desirable embodiment of the invention in the accompanying drawings in which:

Figure 1 is a perspective view of my improved electric toaster for bread showing the bread supporting members and the toaster element in normal position.

Figure 2 is a similar perspective view illustrating the supporting members and the element swung to another position for toasting the reverse sides of the slices of bread supported in the bread supporting members.

Figure 3 is a sectional view on the line 3—3 of Figure 1 illustrating the construction of the toaster.

Figure 4 is an enlarged sectional view on the line 4—4 of Figure 3.

Figure 5 is an enlarged sectional view on the line 5—5 of Figure 3.

Figure 6 is a sectional view on the line 6—6 of Figure 5 illustrating the operative connection between one of the bread supporting members and the heating element.

Figure 7 is a diagrammatical plan view illustrating the operation of the toaster; and Figure 8 is a diagrammatical view similar to Figure 7 illustrating a side elevation of the device and showing its operation.

On the accompanying drawings I have used the reference numeral 10 to indicate a base. The base 10 may be formed of sheet metal or other suitable material and is preferably provided with leg like supporting devices, at each corner. These supporting devices may consist of ears 12 bent from the material of the base 10 with disks 14 of insulating material riveted between the ears. The base 10 is provided for supporting a heater element A and a pair of bread supporting members B. The heating element A may be of any desired construction and I have shown it as consisting of a pair of end members 16 connected by a top member 18 and a bottom member 20. The bottom member 20 is provided with downwardly extending flanges 22 which normally rest on the base 10.

At one corner of the heating element A the flanges 32 are extended as at 34 and pivoted to ears 36 upstanding from the base 10. The pivotal connection may consist of rivets or the like 38. The flanges 32 extend beyond the pivot connections 38 and terminate in quadrant shaped plates 40. The plates 40 extend through slots 43 in the base 10 and are provided with openings 42 equally spaced from the pivot centers 38.

The frame of the heating element A consisting of the members 16, 18, and 20 are designed to support a heating wire 44. I will now describe in detail the manner of supporting the heating wire 44.

Supporting bars G are provided which extend between the end members 16 of the heating element A. Each bar G comprises a web portion 46 having downwardly extending flanges 48 whereby a channel like construction is formed as clearly illustrated in Figure 4 of the drawings. Each flange 48 is provided with an opening 50. Supported between each pair of flanges 48 is an insulator 52 having sleeve like projections 54 on each end for extending through the openings 50 of the flanges. The heating wire 44 extends through the lower left hand bushing 52 then up to the upper left hand bushing and across to the second upper left hand bushing and then down again and so on.

The ends of the heating wire 44 are connected to insulated lead wires 56 and 58. These lead wires extend through bushings 60 formed of insulating material which are positioned in the bottom member 20 of the heating element. The lead wires 56 and 58 then extend through an insulation bushing 62 in the base 10. The bushing 62 is positioned adjacent the pivot connection 38 of the heating element A for a purpose which will hereinafter appear.

The lead wires 56 and 58 are encased in a sleeve 64 and extend into a connector box 66. The connector box 66 is provided with prongs 68 to which a toaster plug of the ordinary construction may be inserted whereby the device may be electrically connected with the service outlet commonly provided in buildings. The wires 56, and 58 are electrically connected to the prongs 68.

The bread supporting members B each comprise a bottom member 70 and two end members 72. The sides of the end members 72 are connected together by grating like side members 74 whereby the heat from the heating wire 44 may be readily transmitted to the slices of bread placed in the bread supporting members B. The bottom 70 of each bread supporting member B has secured thereto a shaft 76. Each shaft 76 is bent downwardly as indicated at 78 and rotatably extends through a plate 80, secured to the base 10.

The plate 80 has a sleeve like extension 82 formed with an in-turned flange 84 whereby the plate 80 and the flange 84 serve as journaling means for the shaft 78. A shoulder 86 may be provided on the shaft 78 to prevent end movement of the shaft in the sleeve 82.

Secured to the bottom end of each shaft 78 is a pinion 86. The pinion 86 is provided with a plurality of teeth 88 and with a flange 90 in which no teeth are formed since during the operation of the device the pinion 86 does not need to rotate more than half a revolution. The teeth 88 of each pinion 86 coact with the openings 42 formed in the plate 40 adjacent that particular pinion. In this manner a gear and pinion connection is provided by the pinion 86 and the perforated plate 40.

*Practical operation.*

In the operation of my device the heating element A and the bread supporting members B normally assume the position illustrated in Figure 1. In this position a slice of bread may be placed in each bread supporting member B and one side of each slice will be toasted by the heating wire 44. After this one side has been sufficiently toasted and it is desirable to toast the other side the heating element A may be rotated on its pivot connections 38 to assume the position illustrated in Figure 2 of the drawings. For convenience in swinging the heating element A a handle 92 is provided thereon. The handle 92 is preferably formed of insulating material.

Due to the gear and pinion connection between the heating element A and the bread supporting members B, the supporting members will swing on their vertical axes while the heating element is being swung on its horizontal axis and when the heating element has assumed the position C shown in Figures 7 and 8, the bread supporting members will have assumed the position D illustrated in Figure 7. In order to reverse the bread, therefore, the heating element has been swung through a quarter circle and the bread supporting members each through half a circle for completely reversing the bread and bringing the heating element into position for toasting the reverse side of the bread. It will therefore be obvious that the operative connection between the element and the bread supporting members must be a two to one connection and this is provided by perforating a quarter circle on the plate 40 with the same number of openings 42 to correspond with an equal number of teeth in half a circle on the pinion 90.

When moved from the normal position as shown in Figure 2, the lead wires 56 and 58 which are preferably formed of flexible cable will merely bend to the new position as illustrated in Figure 2 and yet a good electrical connection with the heating element will be had. If desired when inserting the bread in the bread supporting members, the heating element A may be swung to the position E illustrated in Figure 8 so that the bread supporting members B will assume the position F illustrated in Figure 7 so that the slices of bread can be placed in the bread supporting members while they are in a position remote from the heating element and the heating element will not tend to burn the hand of the operator.

Some changes such as providing another type of gear connection between the heating element and the bread supporting members may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. In a toaster, a heating element pivoted on a horizontal axis and a bread supporting member pivoted on a vertical axis and adapted to swing through a half circle are for reversing the bread relative to the heating element, said heating element and broad supporting member being operatively connected together whereby swinging movement imparted to one will be transmitted to the other.

2. In a toaster, a heating element pivoted on a horizontal axis and adapted to swing through a quarter circle arc, and a bread supporting member pivoted on a vertical axis and adapted to swing through a half circle are for reversing the bread relative to the heating element, said heating element and said bread supporting member being geared together for simultaneous swinging movement.

3. In a toaster, a heating element pivoted on a horizontal axis and a bread supporting member pivoted on a vertical axis, said heating element and said bread supporting member being operatively connected for simultaneous swinging movement.

4. A toaster of the character disclosed comprising a pivotally mounted heating element, a bread supporting member pivotally mounted on an axis at right angles to the pivotal axis of the heating element and means of operative connection between said heating element and said bread supporting member for causing simultaneous pivotal movement of one upon pivotal movement of the other.

5. A toaster of the character disclosed comprising a pivotally mounted heating element, a bread supporting member pivotally mounted on an axis at right angles to the pivotal axis of the heating element and means of operative connection between said heating element and said bread supporting member whereby pivotal movement through half a circle is given to said bread supporting member upon pivotal movement of said heating element through one quarter of a circle.

6. A toaster of the class described comprising a base, a heating element having one of its ends horizontally pivoted thereon, a pair of bread supporting members, each having one end vertically pivoted on said base and means comprising gear devices for operatively connecting said bread supporting members with said heating element.

7. A toaster of the class described comprising a base, a heating element having one of its ends horizontally pivoted thereon, a pair of sleeves extending downwardly from said base, shafts journalled in said sleeves, a pair of bread supporting members, each having one end secured to one of said shafts, pinions on said shafts and gear sectors on said heating element and arranged to coact with each other for operatively connecting said bread supporting members with said heating element.

Des Moines, Iowa, January 14, 1928.

ERNEST S. JOHNSON.